United States Patent Office 3,502,086
Patented Mar. 24, 1970

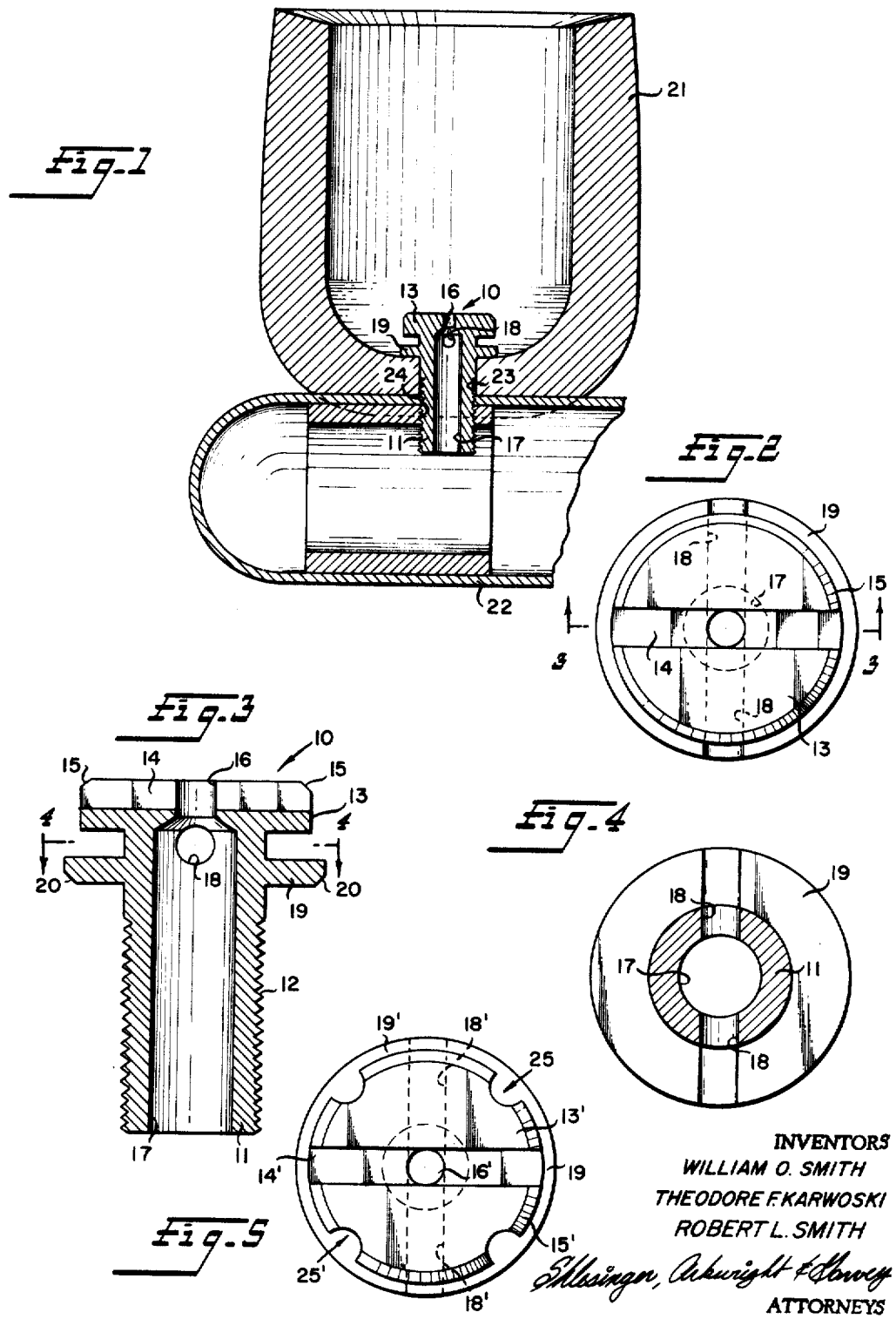

3,502,086
ANTI-CLOGGING FLUID FLOW FITTING
William O. Smith and Theodore F. Karwoski, Burgaw, N.C., and Robert L. Smith, Rte. 1, Box 412, Burgaw, N.C. 28425; said William O. Smith and Theodore F. Karwoski assignors to Robert L. Smith
Continuation of application Ser. No. 541,362, Apr. 8, 1966. This application May 8, 1969, Ser. No. 824,750
Int. Cl. A24f 1/02, 7/04, 13/04
U.S. Cl. 131—205                    7 Claims

ABSTRACT OF THE DISCLOSURE

An anti-clogging fluid flow fitting particularly adapted for use in smoking pipes including a shank, one end of which is theadedly engaged with the stem of the pipe, the opposite end of the shank being provided with a head radiating outwardly from the shank, an axial bore extending through the shank and head, the bore being enlarged from a point adjacent the head to the opposite terminal thereof, a transverse bore immediately subjacent the head and in communication with the axial bore, and a peripheral flange radiating outwardly from the shank and spaced from the head a distance substantially equal to the diameter of the transverse bore, to prevent the entry of relatively large particles between the head and peripheral flange into the transverse bore, the peripheral flange further lying in contiguous relation with the bottom of the pipe bowl.

---

This application is a continuation of application Ser. No. 541,362, Apr. 8, 1966.

This invention relates to an anti-clogging fluid flow fitting, and more particularly to a fitting adapted for insertion in a fluid passageway, to permit the free flow of liquids and/or gases therethrough, the fitting being constructed to prevent clogging with particles of solid materials.

It is an object of this invention to provide a fluid flow fitting having an axial bore to permit the flow of fluid therethrough, and a transverse bore in communication with the axial bore, the fitting being further provided with means for preventing solid particles from lodging in the fitting.

Another object is to provide a fitting of the character described, wherein the axial bore is enlarged internally of the fitting to allow small particles to pass freely through the fitting.

A further object is to provide an anti-clogging fitting including spaced flange portions above and below the transverse bore to prevent the entry of large particles therein.

Other objects are to provide an anti-clogging fitting which is particularly adapted for use in a smoking pipe, connecting the pipe bowl and pipe stem, the size of the axial and transverse bores, and the placement of the flange portions, being such that large tobacco particles will not enter the fitting, and small particles will pass completely therethrough to the pipe stem, thereby effecting an easy draw on the pipe; to provide a fitting which is threadedly engaged through a complemental opening in the bottom of the pipe bowl into a threaded opening in the pipe stem, the fitting being readily inserted and removed for cleaning or replacement; to provide a fitting of the character described wherein the lower flange portion extends beyond the peripheral limit of the upper flange portion to afford a good bearing surface against the bottom of the pipe bowl and to facilitate cleaning of the pipe bowl in the areas of the fitting, and to provide a strong and durable fitting of simple construction which may be economically manufactured.

Other objects of the invention will be manifest from the following description of the present preferred forms of the invention, taken in conjunction with the accompanying drawings, wherein:

FIG. 1 is a fragmentary vertical sectional view of a smoking pipe, illustrating the application of the device of the present invention;

FIG. 2 is a top plan view of the fitting of the present invention per se;

FIG. 3 is a sectional view taken along the line 3—3 of FIG. 2, looking in the direction of the arrows;

FIG. 4 is a sectional view taken along the line 4—4 of FIG. 3, looking in the direction of the arrows; and FIG. 5 is a top plan view of a modified form of fitting, constructed in accordance with the present invention.

Referring now in greater detail to the drawing, the anti-clogging fluid flow fitting of the present invention is generally designated 10 and includes a body portion or shank 11, one end of which is externally threaded as indicated at 12. The opposite terminal of shank 11 is provided with a head or flange portion 13, having a kerf 14 in the outer face thereof, to facilitate threaded engagement of the fitting in a complemental opening by use of a screw driver or the like. Head 13 is chamfered, as indicated at 15.

It is a salient feature of the present invention to provide an axial bore 16 extending through fitting 10, which bore is enlarged at a point below the lower limit of head 13 to provide a fluid passageway 17. It is further within the contemplation of the present invention to provide a transverse bore 18 extending through shank 11 at a point immediately subjacent head 13, which bore is in communication with enlarged passageway 17. It will be noted from a consideration of the drawing that bores 16 and 18 are of substantially the same diameter.

Fitting 10 is further provided with an integral, peripheral flange 19 extending outwardly from shank 11 below, and in spaced relation to, head or flange portion 13. It will be noted from FIG. 3 that flange 19 extends beyond the outer limit of head 13, and the distance between the two flanges is preferably equal to, or slightly less than, the diameter of bore 18 providing a smoke directing groove extending radially outwardly from the shank 17 across the flange 19 as seen in FIGURE 4. The lower edge of flange 19 is chamfered as indicated at 20.

In FIG. 1, there is illustrated the application of the fitting of the present invention to a smoking pipe including a pipe bowl 21 and a stem 22. In this application, the bottom of the pipe bowl is provided with a bore 23 through which shank 11 passes. The lower extremity of threaded portion 12 of shank 11 is threadedly engaged with a threaded bore 24 of stem 22 which bore is aligned with bore 23 of the pipe bowl. In this way, fitting 10 additionally serves as a pipe screw connecting pipe bowl 21 to stem 22, the fitting being readily inserted and removed as desired.

In use of the present fitting in a smoking pipe, as illustrated in FIG. 1, smoke is permitted to enter through axial bore 16 in both ends of transverse bore 18 into enlarged passageway 17, from which point the smoke is drawn downwardly through enlarged passageway 17 into hollow stem 22, and thence through the bit of the pipe into the smoker's mouth.

The size of the bores and passageways as well as the distance between the flanges of the fitting of the present invention may vary for different uses. However, for use in a smoking pipe, it has been found that optimum results are obtained when bores 16 and 18 are substantially one-sixteenth of an inch in diameter and flanges 13 and 19 are approximately three sixty-fourths of an inch apart. In this way, large particles of tobacco are prevented from entering bores 16 and 18, and smaller particles are permitted to pass through the bores 16 and 18 into enlarged passageway 17, where they may gravitate freely into stem 22. In this connection, it is further noted that by providing flanges which are spaced apart a distance which is less than the diameter of transverse bore 18 which lies therebetween, particles of a size which are likely to cause clogging in bore 18 are precluded from entering the same. Additionally, the limited distance between the flange portions prevents particles from filling the recess formed between the flanges and the shank of the fitting. By maintaining the recess between the flanges unobstructed, an even distribution of venting of the bore is effected, resulting in an even drawing on the pipe. The wider lower flange portion 19 facilitates cleaning of the pipe bowl and prevents build up of tobacco particles under head or flange portion 13.

In FIG. 5 there is illustrated a modified form of the fitting shown in FIGS. 1 to 4, wherein like parts are identified by like, primed numbers. In this form of the invention, head or flange 13' is scalloped at intervals along its peripheral edge, as indicated at 25. The scalloped portions are preferably spaced approximately ninety degrees apart and are remote from transverse bore 18'. The scalloped construction facilitates cleaning around the fitting where this device is used in a smoking pipe or other usage requiring periodic cleaning.

The fitting of the present invention is of simple construction and may be manufactured economically. It is strong and durable, and by virtue of its threaded construction, may be readily removed for cleaning or replacement whenever desired.

What we claim is:

1. In a smoking pipe including a vertically arranged pipe bowl having a bottom wall defining a central bore and a pipe stem having a wall defining a bore aligned with the bore of the pipe bowl; an anti-clogging fitting including:
   (a) a vertically disposed elongated shank,
   (b) one end of said shank being in threaded engagement with the wall of the pipe stem defining the pipe stem bore,
   (c) a head at the opposite end of said shank radiating outwardly from said shank and lying in spaced relation to the wall of the pipe bowl,
   (d) said fitting being provided with a wall defining an axial bore which extends completely through said head and shank,
   (e) the diameter of which bore is increased from a point proximate the lower limit of said head to the opposite terminal thereof, relative to the diameter of that portion thereof extending through said head;
   (f) said fitting wall further defining a transverse bore immediately subjacent said head and in communication with the axal bore, and
   (g) a peripheral flange radiating outwardly from said shank below, and spaced from said head a distance which is not greater than the diameter of the transverse bore and lying between the head and peripheral flange,
   (h) the flange radiating outwardly from said shank a distance at least equal to the outward radiation of said head, and
   (j) said peripheral flange further lying in contiguous relation with the pipe bowl.

2. The anti-clogging fitting of claim 1, wherein:
   (a) the distance between said peripheral flange and said head is substantially equal to the diameter of the transverse bowl.

3. The anti-clogging fitting of claim 1, wherein:
   (a) the distance between said peripheral flange and said head is slightly less than the diameter of the transverse bore.

4. The anti-clogging fitting of claim 1, wherein:
   (a) said peripheral flange radiates outwardly a greater distance than that of said head from said shank.

5. The anti-clogging fitting of claim 1, wherein:
   (a) said head has an outer face provided with a kerf to facilitate insertion and removal of the fitting in the pipe bowl.

6. The anti-clogging fitting of claim 1, wherein:
   (a) the diameter of the transverse bore is smaller than the diameter of the enlarged portion of the axial bore.

7. The anti-clogging fitting of claim 1, wherein:
   (a) said head is scalloped at intervals.

References Cited

UNITED STATES PATENTS

| 1,633,240 | 6/1927 | Blidsoe | 131—206 X |
| 1,857,075 | 8/1932 | Whelen | 131—205 |
| 2,250,994 | 7/1941 | La Franca | 131—205 |
| 2,264,626 | 12/1941 | Dunwoodie | 131—224 X |
| 2,363,144 | 11/1944 | Ricketts | 131—225 X |
| 2,624,345 | 1/1953 | Rosenthal | 131—225 X |
| 2,753,873 | 7/1956 | Kirsten | 131—225 X |
| 2,969,796 | 1/1961 | Klopp | 131—205 |

FOREIGN PATENTS

| 167,999 | 8/1921 | Great Britain. |
| 4,616 | of 1896 | Great Britain. |
| 243,612 | 12/1925 | Great Britain. |
| 326,804 | 3/1930 | Great Britain. |

JOSEPH S. REICH, Primary Examiner

U.S. Cl. X.R.

131—225